United States Patent
Harada et al.

(10) Patent No.: US 12,185,223 B2
(45) Date of Patent: Dec. 31, 2024

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daisuke Murayama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 337 days.

(21) Appl. No.: 17/438,146

(22) PCT Filed: Mar. 12, 2019

(86) PCT No.: PCT/JP2019/010102
§ 371 (c)(1),
(2) Date: Sep. 10, 2021

(87) PCT Pub. No.: WO2020/183625
PCT Pub. Date: Sep. 17, 2020

(65) Prior Publication Data
US 2022/0210720 A1    Jun. 30, 2022

(51) Int. Cl.
*H04W 48/10* (2009.01)
*H04W 74/0808* (2024.01)

(52) U.S. Cl.
CPC ....... *H04W 48/10* (2013.01); *H04W 74/0808* (2013.01)

(58) Field of Classification Search
CPC ............. H04W 48/10; H04W 74/0808; H04L 27/2692; H04L 27/2613; H04L 27/2666; H04L 5/0053
See application file for complete search history.

(56) References Cited

U.S. PATENT DOCUMENTS

| | | | |
|---|---|---|---|
| 2018/0324843 A1 | 11/2018 | Lee et al. | |
| 2020/0127879 A1 | 4/2020 | Yokomakura et al. | |
| 2020/0178253 A1 | 6/2020 | Gao et al. | |
| 2020/0195358 A1* | 6/2020 | Yokomakura | H04W 36/0094 |

(Continued)

FOREIGN PATENT DOCUMENTS

| | | |
|---|---|---|
| CN | 108809504 A | 11/2018 |
| CN | 109327912 A | 2/2019 |

(Continued)

OTHER PUBLICATIONS

Office Action issued in the counterpart Russian Patent Application No. 2021127956/07(059112), mailed on Jun. 14, 2022 (10 pages).

(Continued)

*Primary Examiner* — Justin Y Lee
(74) *Attorney, Agent, or Firm* — Bergman Watanabe & Burton LLP

(57) ABSTRACT

A user terminal according to an aspect of the present disclosure includes: a receiving section that receives, on a given carrier, a synchronization signal block (SSB) which includes a PBCH which does not include given information included in a physical broadcast channel (PBCH) payload other than a master information block (MIB) defined in Release 15 new radio (NR); and a control section that assumes that a value of the given information is a given value. According to one aspect of the present disclosure, the frame timing can be appropriately derived in the NR-U carrier.

8 Claims, 14 Drawing Sheets

(56) References Cited

U.S. PATENT DOCUMENTS

| | | | |
|---|---|---|---|
| 2020/0236711 A1* | 7/2020 | Nam | H04W 74/0808 |
| 2021/0282228 A1 | 9/2021 | Si et al. | |
| 2022/0015020 A1* | 1/2022 | Määttänen | H04W 48/16 |
| 2022/0124648 A1 | 4/2022 | Harada | |

FOREIGN PATENT DOCUMENTS

| | | | |
|---|---|---|---|
| EP | 3857973 A1 | 8/2021 | |
| EP | 3917192 A1 | 12/2021 | |
| WO | 2018199162 A1 | 11/2018 | |
| WO | 2018199243 A1 | 11/2018 | |
| WO | 2019/029621 A1 | 2/2019 | |

OTHER PUBLICATIONS

Office Action issued in Chinese Application No. 201980096326.X, dated Jun. 29, 2023 (17 pages).

International Search Report issued in PCT/JP2019/010102 on May 7, 2019 (2 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

3GPP TS 38.212 V15.4.0; "3rd Generation Partnership Project; Technical Specification Group Radio Access Network; NR; Multiplexing and channel coding (Release 15)"; Dec. 2018 (108 pages).

Huawei, HiSilicon; "On the size of MIB"; 3GPP TSG-RAN2 Meeting #AH-1801, R2-1801195; Vancouver, Canada; Jan. 22-26, 2018 (4 pages).

Extended European Search Report issued in counterpart European Patent Application No. 19919049.7, mailed on Oct. 11, 2022 (10 pages).

Qualcomm Incorporated; "SS block, burst-set composition, and time index indication"; 3GPP TSG-RAN WG1 NR #88bis, R1-1705565; Spokane, USA; Apr. 3-7, 2017 (9 pages).

* cited by examiner

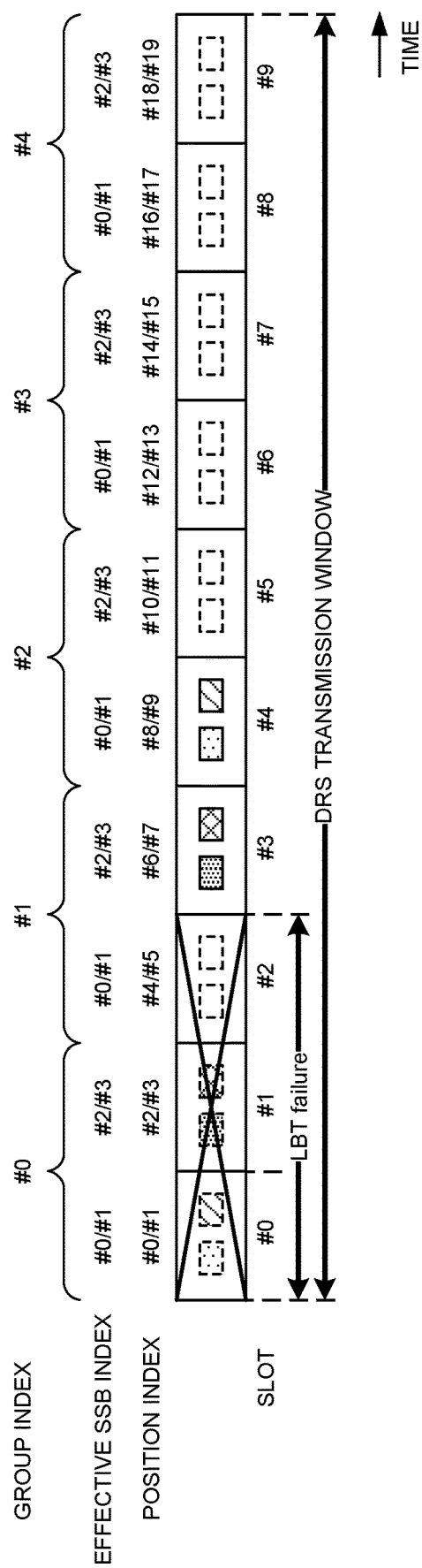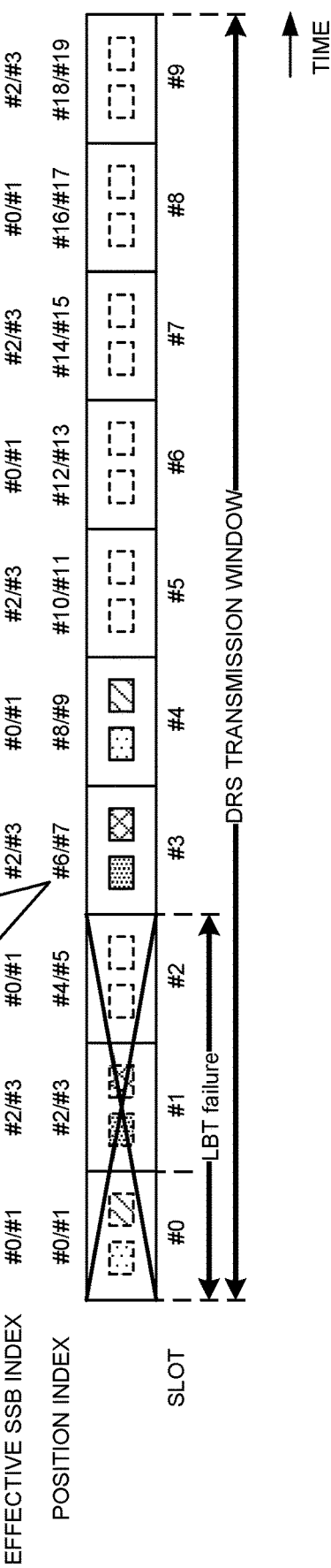

USER TERMINAL AND RADIO COMMUNICATION METHOD

TECHNICAL FIELD

The present disclosure relates to a user terminal and a radio communication method in next-generation mobile communication systems.

BACKGROUND ART

In a universal mobile telecommunications system (UMTS) network, specifications of long term evolution (LTE) have been drafted for the purpose of further increasing a data rate, providing low latency, and the like (see Non Patent Literature 1). Further, the specifications of LTE-Advanced (third generation partnership project (3GPP) Release. (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), new radio (NR), and 3GPP Rel. 15 or later) are considered.

In existing LTE systems (for example, Rel. 8 to 12), the specifications have been drafted assuming that exclusive operation is performed in a frequency band licensed to a telecommunications operator (operator) (also referred to as a licensed band, a licensed carrier, a licensed component carrier (licensed CC), and the like). As the licensed CC, for example, 800 MHz, 1.7 GHz, 2 GHz, or the like, is used.

Further, in the existing LTE system (for example, Rel. 13), in order to extend the frequency band, the use of a frequency band different from the above licensed band (also referred to as an unlicensed band, an unlicensed carrier or an unlicensed CC) is supported. As the unlicensed band, for example, 2.4 GHz band or 5 GHz band in which Wi-Fi (registered trademark) or Bluetooth (registered trademark) can be used is assumed.

In Rel. 13, carrier aggregation (CA) that integrates a carrier (CC) in the licensed band and a carrier (CC) in the unlicensed band is supported. The communication performed using the unlicensed band together with the licensed band is called license-assisted access (LAA).

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Use of the unlicensed band is also studied in NR. Before data transmission in the unlicensed band, listening (also referred to as Listen Before Talk (LBT) or the like) is performed.

In the NR, a synchronization signal (SS)/physical broadcast channel (PBCH) block (SS block (SSB)) is used. In the unlicensed band, deriving the frame timing based on the SSB has been studied.

For example, it has been studied to specify a candidate position of a detected SSB by including information necessary for frame timing derivation in a PBCH payload. However, how to configure the information, how to set the number of bits, and the like have not yet been studied. If the information necessary for frame timing derivation is not appropriately included in the PBCH payload, the UE cannot appropriately derive the frame timing, and the communication throughput may decrease.

In this regard, an object of the present disclosure is to provide a user terminal and a radio communication method capable of appropriately deriving a frame timing in an NR-U carrier.

Solution to Problem

A user terminal according to an aspect of the present disclosure includes: a receiving section that receives, on a given carrier, a synchronization signal block (SSB) which includes a PBCH which does not include given information included in a physical broadcast channel (PBCH) payload other than a master information block (MIB) defined in Release 15 new radio (NR); and a control section that assumes that a value of the given information is a given value.

Advantageous Effects of Invention

According to one aspect of the present disclosure, the frame timing can be appropriately derived in the NR-U carrier.

BRIEF DESCRIPTION OF DRAWINGS

FIGS. 4A and 4B are diagrams illustrating a specific example of SSB candidate positions.

DESCRIPTION OF EMBODIMENTS

<Unlicensed Band>

Figure 1:
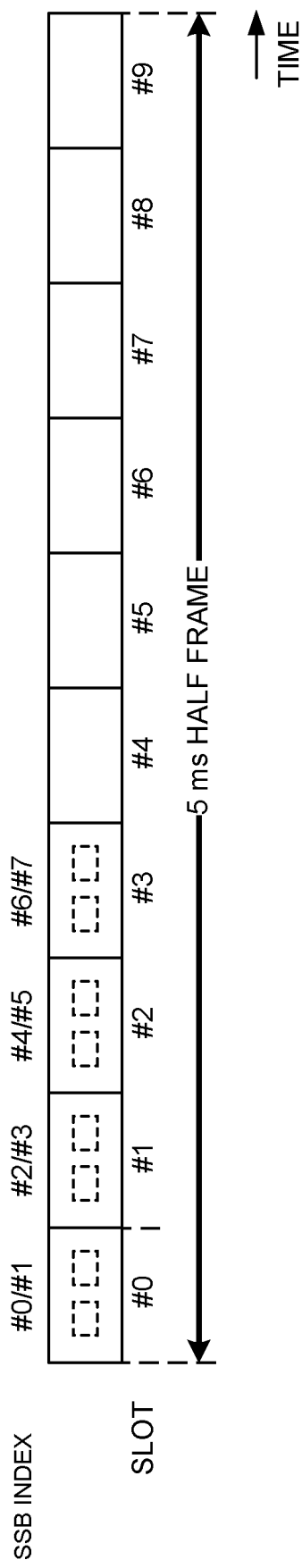
FIG. 1 is a diagram illustrating an example of SSB transmission candidate positions.

In the unlicensed band (for example, 2.4 GHz band, 5 GHz band, or 6 GHz band), it is assumed that a plurality of systems such as a Wi-Fi system and a system supporting LAA (LAA system) coexist. Therefore, it is necessary to avoid collision of transmissions and/or control interference between the plurality of systems.

In LAA of the existing LTE system (for example, Rel. 13), a transmission apparatus of data performs listening (also referred to as listen before talk (LBT), clear channel assessment (CCA), carrier sense, channel sensing, channel access operation, and the like) for ascertaining the presence or absence of transmission of another apparatus (for example, a base station, a user terminal, a Wi-Fi device, and the like) before transmission of data in the unlicensed band.

The transmission apparatus may be, for example, a base station (for example, gNodeB (gNB)) in the downlink (DL) and a user terminal (for example, user equipment (UE)) in the uplink (UL). Further, the reception apparatus that receives data from the transmission apparatus may be, for example, a UE in DL and a base station in UL.

In the LAA of the existing LTE system, the transmission apparatus starts data transmission after a given period (for example, immediately or a backoff period) after it is detected that there is no transmission of another apparatus in the LBT (idle state).

An NR system using an unlicensed band may be referred to as an NR-unlicensed (U) system, an NR LAA system, or the like. Dual connectivity (DC) between the licensed band, the unlicensed band or stand-alone (SA) of the unlicensed band, or the like may be included in the NR-U.

A node (for example, a base station or a UE) in the NR-U ascertains that a channel is idle by the LBT for coexistence with other systems or other operators, and then starts transmission.

In the NR-U system, a base station or a UE obtains a transmission opportunity (TxOP) and performs transmission when an LBT result is idle (LBT-idle). The base station or the UE does not perform transmission when the LBT result is busy (LBT-busy). A time of the transmission opportunity is also referred to as a channel occupancy time (COT).

Note that the LBT-idle may be replaced with LBT success. LBT-busy may be replaced with LBT failure.

<SSB>

In NR, a synchronization signal/physical broadcast channel (SS/PBCH) block is used. The SS/PBCH block may be a signal block including at least one of a primary synchronization signal (PSS), a secondary synchronization signal (SSS), and a broadcast channel (physical broadcast channel (PBCH)) (and a demodulation reference signal (DMRS) for PBCH). The SS/PBCH block may be also referred to as a synchronization signal block (SSB).

The transmission unit of the SSB may be referred to as an SSB transmission period, an SSB set, an SS burst, an SS burst set, an SSB burst, simply a burst, or the like. The SS burst may mean a set of SSBs included per given period (for example, a half-frame (0.5 radio frames=5 ms)). The SSB index may indicate a position of the SSB per given time period (for example, a half frame).

The SSB index may be represented by a quantity of up to three bits in Frequency Range 1 (FR1), or may be acquired by the UE through a sequence of DMRSs in the PBCH. In Frequency Range 2 (FR2), the SSB index may be represented by a total of six bits of lower three bits according to a sequence of DMRSs of the PBCH and higher three bits according to a payload of the PBCH, or may be acquired by the UE on the basis of these.

FIG. 1 is a diagram illustrating an example of SSB transmission candidate positions. This example is an example of FR1, and it is assumed that the subcarrier spacing (SCS) of the serving cell (or SSB) is 30 kHz, and a slot length is 0.5 ms. In the following drawings, a similar SCS (and slot length) is assumed. Note that application of the present disclosure is not limited to these frequency ranges, SCS (and slot length), and the like.

As illustrated in FIG. 1, for example, in FR1, eight SSB transmission candidate positions (indicated by broken lines) may be included in a half frame. The SSB transmission candidate positions correspond to an SSB index #0 to #7, respectively, and may be implicitly notified to the UE by using different DMRS sequences, respectively. The UE can specify the SSB index on the basis of which DMRS sequence is detected among the eight patterns of DMRS sequences.

Note that, in the present disclosure, the SSB corresponding to the SSB index is also simply referred to as an SSB index. Further, the beam corresponding to the beam index is also simply referred to as a beam index.

Here, each PBCH payload in the same half-frame is exactly the same. That is, the PBCH payload included in the SSB of the first SSB index in a half-frame is the same as the PBCH payload included in the SSB of the second SSB index in the same half-frame. According to this configuration, the UE in which the plurality of SSBs can be detected can easily perform soft combining of the PBCH, and the reception quality of the PBCH can be improved.

Each master information block (MIB) within a PBCH transmission time interval (PBCH TTI) (=80 ms) is exactly the same.

On the other hand, the PBCH payload other than the MIB is 8 bits in Rel-15 NR, and includes the following information for FR1:

the lower 4 bits (4 bits) of the system frame number (SFN);
a half-frame bit (1 bit);
higher 1 bit (1 bit) of ssb-SubcarrierOffset ($k_{SSB}$); and
Reserved (2 bits).

Here, ssb-SubcarrierOffset corresponds to a value $k_{SSB}$ indicating a frequency domain offset between the SSB and the entire resource block grid by the number of subcarriers. In the ssb-SubcarrierOffset, 4 bits are notified in the MIB, and thus the $k_{SSB}$ may be represented by 5 bits in consideration of the higher 1 bit of the $k_{SSB}$ included in the PBCH payload. In the present disclosure, the ssb-SubcarrierOffset and the $k_{SSB}$ may be replaced with each other.

Note that, for FR2, the higher 1 bit of the $k_{SSB}$ and the total of 3 bits of Reserved may indicate the higher 3 bits of the SSB index.

Figure 2:
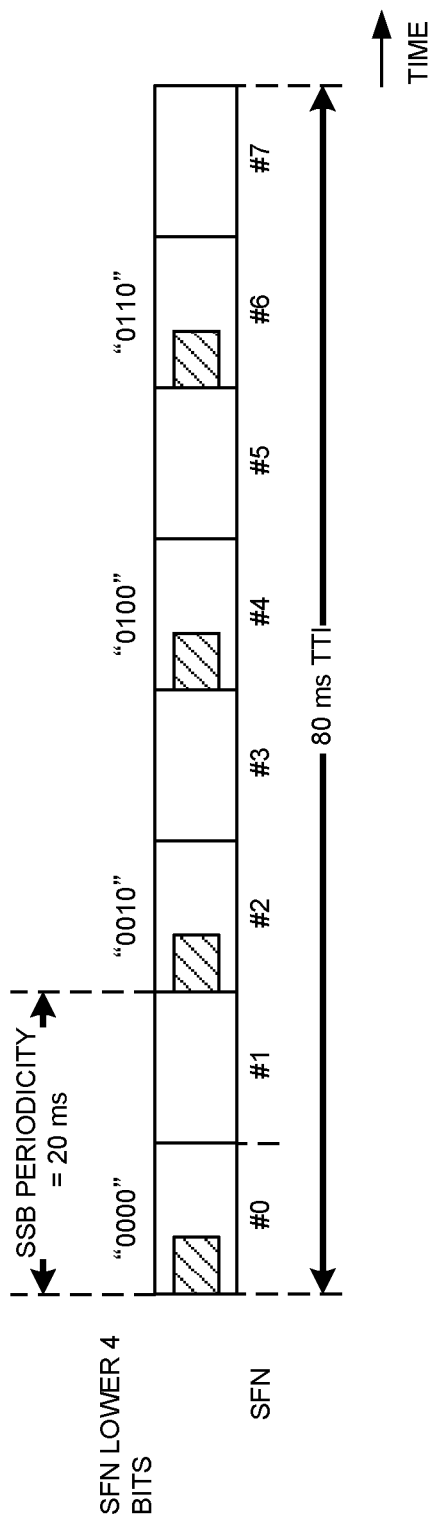
FIG. 2 is a diagram illustrating an example of a PBCH payload in a PBCH TTI.

Even within the PBCH TTI, the lower 4 bits of the SFN also change from frame to frame. FIG. 2 is a diagram illustrating an example of the PBCH payload in the PBCH TTI. In this example, the SSB is transmitted in a periodicity of 20 ms from SFN #0 in eight radio frames (SFN #0 to SFN #7) corresponding to the PBCH TTI (80 ms).

The lower four bits of the SFN are "0000" in SFN #0, "0010" in SFN #2, "0100" in SFN #4, and "0110" in SFN #6. Therefore, in the SSB having a periodicity of 20 ms, only the second and third bits of the lower 4 bits of the SFN change, and the first and fourth bits are fixed values.

The half-frame bits vary depending on the position (first or second) of the half-frame within the radio frame in a case where the SSB periodicity is less than or equal to 5 ms, but is the same between different SSB bursts within the PBCH TTI in a case where the SSB periodicity is greater than 5 ms.

The higher 1 bit of $k_{SSB}$ and Reserved are the same between different SSB bursts.

The UE may be configured with higher layer parameters (for example, may be referred to as a radio resource control (RRC) parameter "ssb-PositionsInBurst") for SSB burst. The higher layer parameter may be referred to as information (parameter) regarding the position of the time domain of the transmitted SSB in the burst. In the present disclosure, the higher layer parameter is described as ssb-PositionsIn-Burst, but the name is not limited thereto.

The UE may assume that SSBs corresponding to the same SSB index in the same cell are QCL. Further, the UE may not assume QCL between SSBs corresponding to different SSB indexes of the same cell.

Incidentally, QCL may be an index indicating a statistical property of at least one (expressed as a signal/channel) of a signal and a channel. For example, in a case where one signal/channel and another signal/channel have a QCL relation, this may mean that it is possible to assume that the plurality of different signals/channels have at least one identical property out of Doppler shift, Doppler spread, average delay, delay spread, or spatial parameter (for example, spatial Rx parameter) (a QCL relation is established regarding at least one of these).

Note that it may be referred to as a QCL assumption for UE to assume that a given control resource set (CORESET), channel, or reference signal has a specific QCL (for example, QCL type D) relation with another CORESET, channel, or reference signal.

<SSB of NR-U>

In the NR-U, use of a discovery reference signal (discovery reference signal (DRS), NR-U DRS, or the like) has been studied. The DRS may be a temporally continuous signal including a set of one or more SSBs and CORESET and physical downlink shared channel (PDSCH) associated with the one or more SSBs. The DRS may include channel state information (CSI)-reference signal (RS). Further, the DRS may be referred to as a discovery reference signal, a discovery signal (DS), or the like.

The CORESET (physical downlink control channel (PDCCH)) associated with the SSB may be referred to as remaining minimum system information (RMSI)-CORESET, CORESET #0, or the like. The RMSI may be referred to as SIB1. The PDSCH associated with the SSB may be a PDSCH (RMSI PDSCH) carrying RMSI, or may be a PDSCH scheduled by using a PDCCH (DCI with cyclic redundancy check (CRC) scrambled by system information (SI)-radio network temporary identifier (RNTI)) in an RMSI-CORESET.

SSBs with different SSB indexes may be transmitted by using different beams (base station Tx beam). The SSB and RMSI PDCCH and RMSI PDSCH corresponding thereto may be transmitted using the same beam.

One DRS may be referred to as a DRS unit. A DRS unit size (time length) may be, for example, a half slot, one slot, or the like.

For the NR-U, considering a case where a DRS including an SSB cannot be transmitted due to failure of LBT, it is studied to extend a transmission candidate position of the SSB. For example, it is studied to, in a period (DRS transmission window) in which a DRS is likely to be transmitted, extend an SSB transmission candidate position and transmit SSBs (beams) which cannot be transmitted due to LBT failure by using another transmission candidate position in the window.

Note that the length of the DRS transmission window may be configured in the UE by higher layer signaling, or may be defined by a specification. The DRS transmission window may be referred to as a DRS transmission period, a DRS transmission window period, a DRS window, or the like.

In the present disclosure, higher layer signaling may be, for example, any of radio resource control (RRC) signaling, medium access control (MAC) signaling, broadcast information, and the like, or a combination thereof.

For the MAC signaling, for example, a MAC control element (MAC CE), a MAC protocol data unit (PDU), or the like may be used. The broadcast information may be, for example, a master information block (MIB), a system information block (SIB), remaining minimum system information (RMSI), other system information (OSI), and the like.

In the present disclosure, the SSB transmission candidate position may represent a position of a first symbol of the SSB candidate. The SSB transmission candidate position may be replaced with a DRS transmission candidate position, a DRS unit, or the like.

Figure 3:
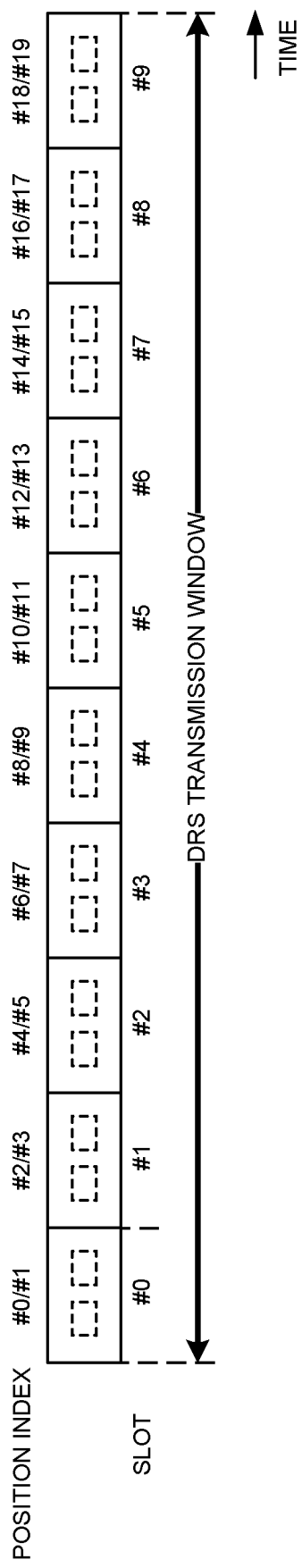
FIG. 3 is a diagram illustrating an example of extension of the SSB transmission candidate positions.

FIG. 3 is a diagram illustrating an example of extension of the SSB transmission candidate positions. In this example, it is assumed that a length of the DRS transmission window is 5 ms. In the following drawings, a similar DRS transmission window length is assumed. Note that application of the present disclosure is not limited to this DRS transmission window length.

In FIG. 3, one SSB candidate position is included per half slot, and 20 SSB transmission candidate positions (candidate position indexes=#0 to #19) are illustrated in a DRS transmission window (half frame).

Incidentally, the beam index may correspond to a set of SSB indexes that can be QCL-assumed in the DRS transmission window. Therefore, the beam index may be replaced with an effective SSB index (effective SSB index). For example, in a case where the base station uses four SSB beams, the UE may assume that SSBs of candidate position indexes #4i to #4i+3 (i is an integer greater than or equal to 0) are respectively SSBs and QCLs of effective SSB indexes #0 to #3.

As illustrated in FIG. 3, an index merely indicating an SSB candidate position in the DRS transmission window may be referred to as an SSB position index, a position index (location index), a candidate position index, or the like.

It is studied that which candidate position in the DRS transmission window the SSB is detected is determined by the UE on the basis of any of the following:

(1) a combination of a DMRS sequence and a PBCH payload;
(2) DMRS sequence only;
(3) PBCH payload only; and
(4) A combination of a DMRS sequence and a phase difference between DMRS and a secondary synchronization signal (SSS).

FIGS. 4A and 4B are diagrams illustrating a specific example of SSB candidate positions. In this example, based on the above (1), it is assumed that the UE specifies the position of the detected SSB within the DRS transmission window.

In this example, the slots #0 to #2 are not transmitted due to failure of LBT. The effective SSB indexes #0 to #3 corresponding to the position indexes #0 to #3 that were to be transmitted in the slots #0 and #1 may be transmitted in the slots #3 and #4 (position indexes #6 to #9) in the same DRS transmission window.

In FIGS. 4A and 4B, SSBs with the same shading may represent that the same beam is applied (or the same QCL is assumed). SSBs with different shading may represent that different beams are applied to the SSBs (or different QCLs are assumed).

In FIGS. 4A and 4B, when detecting an SSB, the UE acquires an effective index based on the DMRS sequence of the SSB.

In the example of FIG. 4A, the PBCH payload of each SSB may include information in units of wrap around (or wrapping around) and information of a group index.

The information in units of wrap around may correspond to information on how many SSB candidate positions (position indexes) the same effective SSB index repeats. The information of (1) above may be referred to as, for example, information of the maximum number of effective SSB indexes, information of the periodicity of the effective SSB index, information of the repeated transmission unit of the SSB, or information of the number of transmission SSBs. Note that the wrap around may mean that the index such as the effective SSB index returns to 0 after reaching the maximum value. The units of wrap around are desirably the same within one DRS transmission window.

The information of the group index may correspond to the information for deriving the half-frame timing of the cell, and may indicate which order of wrap around the candidate position corresponds to. The information of the group index may be referred to as, for example, information regarding the position index of the detected SSB in the DRS transmission window, information regarding specifying which order of SSB in the same effective SSB index in the DRS transmission window the detected SSB is, information for specifying the position index from the effective SSB index, timing related information, or timing information.

FIG. 4A illustrates an example in which the unit of wrap around is four, and the group indexes are #0 to #4. Note that the unit of the wrap around may be expressed by the number of slots (or the DRS unit size), and in the case of FIG. 4A, the unit of the wrap around may be expressed to be 2 slots.

The group index indicates which order of candidate position within the DRS transmission window the same effective SSB index is. For example, in FIG. 4A, the position index corresponding to the group index=i (i=0 to 4) may correspond to #Mi, #Mi+1, . . . , and #Mi+(M−1), where M (M=4) is a unit of wrap around.

The UE may specify (determine) the position index corresponding to the effective SSB index in the DRS transmission window for the detected cell and the neighboring cell (at least a cell of the same operator) of the same frequency based on the unit of wrap around acquired by decoding the PBCH.

The UE may specify (determine) the half-frame timing of the detected cell and the neighboring cell of the same frequency based on the group index acquired by decoding the PBCH. Note that, in the present disclosure, the half-frame timing may be replaced with at least one of frame timing, slot timing, and the like.

For example, the UE may decide that the position index of the detected SSB is #7 when acquiring the effective SSB index #3 based on the DMRS sequence and acquiring the unit of wrap around=4 and the group index=#1 based on the PBCH payload.

In the example of FIG. 4B, the PBCH payload of each SSB may include information of the unit of wrap around described above and information of a burst starting position index. The control related to the unit of wrap around may be the same as that in FIG. 4A, and thus, description thereof is not repeated.

The information of the burst starting position index may be referred to as, for example, information of an SSB candidate position index in which the transmission of an SSB burst is started, information of a burst start SSB candidate position index, or the like.

The UE may specify (determine) the half-frame timing of the detected cell and the neighboring cell of the same frequency based on the burst starting position index acquired by decoding the PBCH.

For example, the UE may decide that the position index of the detected SSB is #7 when acquiring the effective SSB index #3 based on the DMRS sequence and acquiring the unit of wrap around=4 and the burst starting position index=#6 based on the PBCH payload.

<Problem of Deciding SSB Candidate Position of NR-U>

As described above, it is studied to specify a candidate position of the detected SSB by including information (for example, at least one of the information of the unit of wrap around, the information of the group index, and the information of the burst starting position index) necessary for frame timing derivation in the PBCH payload. However, the MIB of the PBCH is necessarily constant within the PBCH TTI. A study is not yet made about a specific configuration in which information such as the unit of wrap around is included in the PBCH payload in consideration of this.

Figure 5:
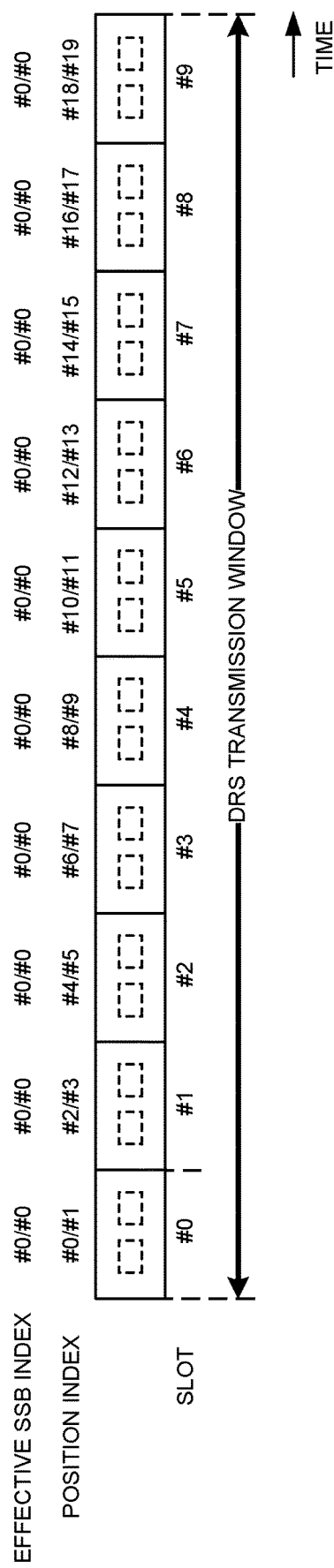
FIG. 5 is a diagram illustrating an example of a problem of deciding an SSB candidate position of an NR-U.

In the information of the group index and the information of the burst starting position index, the number of bits may excessively increase. FIG. 5 is a diagram illustrating an example of a problem of deciding the SSB candidate position of the NR-U. In this example, the unit of the wrap around is 1. That is, the same effective SSB index corresponds to each position index.

In this case, both the group index and the burst starting position index need to take a value of 0-19, and 5 bits are required to express each index.

There is a problem that the complexity of soft combining of the PBCH payload increases as the number of bits which can vary depending on the position increases. As described above, the half-frame bit, the lowest bit of the SFN, and the like may change between bursts when the SSB periodicity is small.

Incidentally, in above (3), more bits than (1) may be changed. In the above (2) and (4), it is necessary to consider an influence on detection characteristics or implementation, such as increasing the number of DMRS sequence patterns or requiring a mechanism for detecting a phase difference between DMRS and SSS. Therefore, it is desirable to use above (1), and it is required to suppress the number of bits which can change in the PBCH payload within a burst and between bursts.

If the information necessary for frame timing derivation is not appropriately included in the PBCH payload, the UE cannot appropriately derive the frame timing, and the communication throughput may decrease.

In this regard, the present inventors have conceived a method for preventing deterioration of detection characteristics, detection delays, and the like of PBCHs by configuring PBCH payloads of different SSBs in a PBCH TTI such that MIB is always common, and remaining bits are common as much as possible even in an NR-U carrier, thereby easily enabling soft coupling of PBCHs in a burst.

Hereinafter, embodiments according to the present disclosure will be described in detail with reference to the drawings. A radio communication method according to each of the embodiments may be applied independently, or may be applied in combination with others.

The NR-U of the present disclosure is not limited to the LAA, and a case where an unlicensed band is used in a stand-alone manner may be included. Note that the NR-U carrier may be replaced with a carrier in which the LBT is used, an unlicensed carrier, an unlicensed band, a given carrier, or the like.

(Radio Communication Method)

First Embodiment

In a first embodiment, the UE may not assume that a value (for example, 5 ms, 10 ms, or the like) shorter than a given value (for example, 20 ms) is used (or configured) as the SSB (DRS) transmission periodicity in the NR-U carrier.

In the NR-U carrier, information included in an existing PBCH payload other than the MIB may not be included. In this case, the UE may assume a given value (for example, 0, 1) for the information included in the existing PBCH payload other than the MIB. The "existing PBCH payload other than the MIB" described herein may mean a PBCH payload other than the MIB of Rel-15 NR at the time of this application.

For example, the UE may assume that in the NR-U carrier, no half-frame bits are included in the PBCH payload, and the half-frame bits are always 0 (or 1). This is because it is difficult to fix a time division duplex (TDD) pattern or the like in the unlicensed band, and thus the SSB (DRS) may always decide that the frame is a specific (for example, the first) half frame of SFN #0 and a half frame of a given periodicity with the half frame as a reference.

The UE may assume that in the NR-U carrier, the higher 1 bit of the $k_{SSB}$ is not included in the PBCH payload, and the higher 1 bit of the $k_{SSB}$ is always 0 (or 1). The higher 1 bit of ssb-SubcarrierOffset is used in a case where the SCS of the SSB is smaller than the SCS of the RMSI PDCCH/PDSCH. That is, the UE may assume that the SCS of the SSB is always the same as or larger than the SCS of the RMSI PDCCH/PDSCH in the NR-U carrier (always higher 1 bit=0). Alternatively, the UE may assume that a physical resource block (PRB) of the SSB and a PRB of the RMSI PDCCH/PDSCH are always the same in the NR-U carrier (always $k_{SSB}=0$).

In the NR-U carrier, the UE may assume that the PBCH payload does not include a given number of bits (for example, lower X bits) among the lower 4 bits of the SFN, and the given number of bits always has a fixed value (for example, all 0 (or all 1)). This is because when the SSB (DRS) transmission periodicity is, for example, $10*2^X$ ms or more, the lower X bits are always fixed (for example, 0 fixed).

According to the first embodiment described above, the PBCH payload other than the MIB can be reduced by, for example, about 4 to 6 bits as compared with the PBCH payload other than the MIB in Rel-15 NR, and can be used for notification of other information.

Second Embodiment

A second embodiment relates to how information required for frame timing derivation is included in a PBCH payload in an NR-U carrier.

Among the information necessary for frame timing derivation, information in units of wrap around may be included in the MIB, and information (for example, the group index) which can change in other PBCH TTIs may be sent by bits outside the MIB.

[Unit of Wrap Around]

As described above, the unit of wrap around is a parameter which determines mapping between a candidate position index and an effective SSB index, and corresponds to a value which does not change in the DRS transmission window. Therefore, it is preferable to include the unit of wrap around in the MIB.

Figure 6:
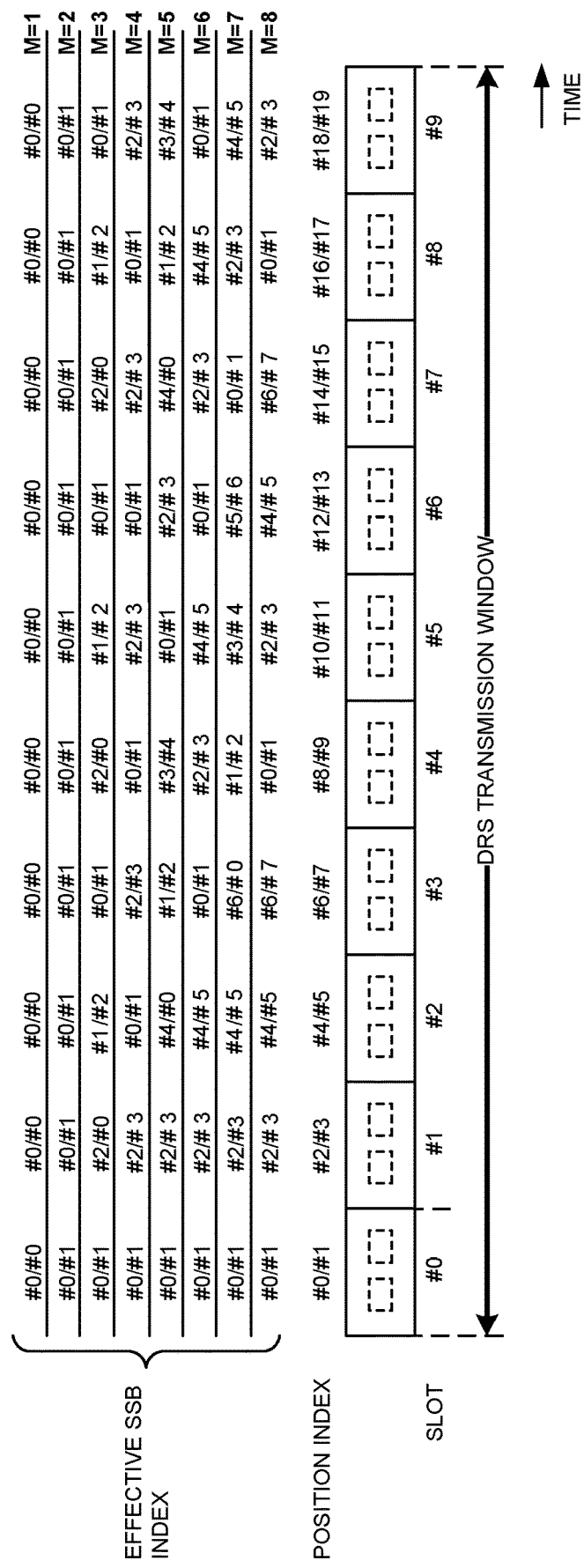
FIG. 6 is a diagram illustrating an example of mapping between a candidate position index and an effective SSB index.

FIG. 6 is a diagram illustrating an example of the mapping between the candidate position index and the effective SSB index. M in the drawing indicates a value in units of wrap around. The UE may assume that, when M=i (i is an integer), the candidate position indexes #Mi, #Mi+1, . . . , #Mi+(M−1) correspond to the effective SSB indexes #i, #i+1, . . . , #i+(M−1). For example, the UE may assume that all candidate position indexes are the effective SSB index #0 when M=1.

In the existing MIB in the Rel-15 NR, there is no parameter corresponding to the unit of wrap around. Therefore, the information of the unit of wrap around may be explicitly or implicitly notified to the UE by using at least one of parameters (for example, pdcch-ConfigSIB1, ssb-SubcarrierOffset) of the existing MIB (of Release 15 new radio (NR)).

For example, in Rel-15 NR, the UE decides CORESET #0 (CORESET zero, CORESET with ID #0) and search space #0 (search space zero, common search space with ID #0) based on information (RRC parameter "pdcch-ConfigSIB1") for deciding a common CORESET, a common search space, and necessary PDCCH parameters. More specifically, the UE decides the configuration (such as the number of symbols of CORESET) of CORESET #0 based on the values of the higher 4 bits (RRC parameter "controlResourceSetZero") of pdcch-ConfigSIB1, and decides the configuration (such as the PDCCH monitoring periodicity) of search space #0 based on the values of the lower 4 bits (RRC parameter "searchSpaceZero") of pdcch-ConfigSIB1.

The UE may decide the value of the unit of wrap around based on the value of a specific bit (for example, higher 4 bits and lower 4 bits) of pdcch-ConfigSIB1. The correspondence between the specific bit and the value of the unit of wrap around may be determined by a specification and may be defined by a table different from Rel-15 NR, for example. The unit of wrap around may be included as a part of configuration of at least one of CORESET #0 and search space #0 associated with pdcch-ConfigSIB1 in the NR-U.

[Group Index]

As described above, the group index is a parameter indicating which order of wrap around the candidate position corresponds to, and changes within the DRS transmission window. Therefore, the group index is preferably included in a part that is not the MIB in the PBCH payload.

Figure 7:
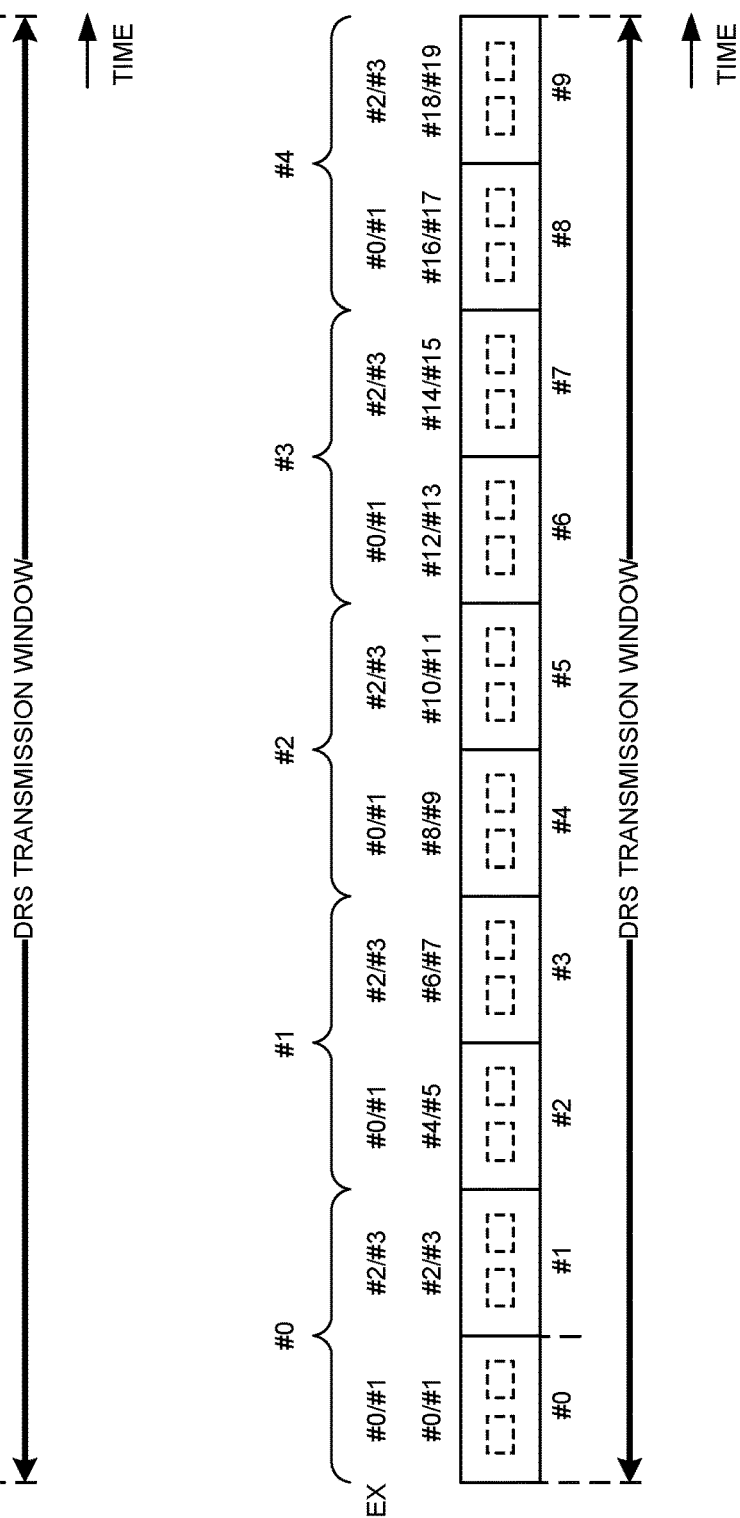
FIGS. 7A and 7B are diagrams illustrating an example of a group index.

FIGS. 7A and 7B are diagrams illustrating an example of the group index. The unit of wrap around is 8 in FIG. 7A and 4 in FIG. 7B.

Note that the smaller the value of the unit of wrap around, the larger the number of bits required to represent the group index. Further, as the value of the unit of wrap around is smaller, the number (that is, the number of SSBs with the same PBCH payloads) of SSBs in the group (same wrap around) is smaller, and soft combining becomes more difficult.

Figure 8:
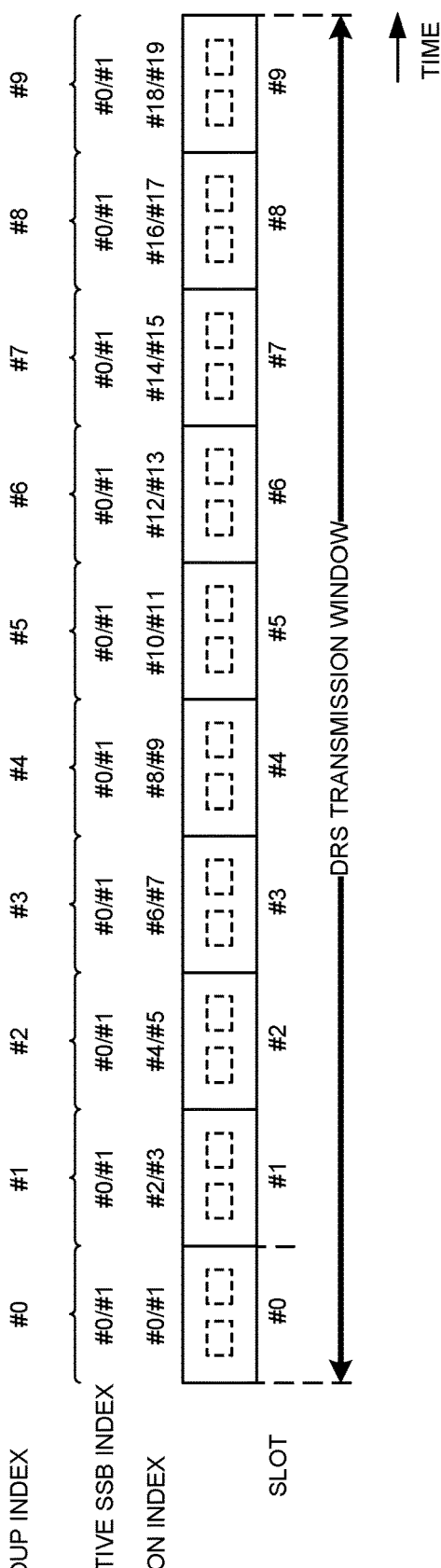
FIG. 8 is a diagram illustrating an example of a case where a unit of wrap around is small.

FIG. 8 is a diagram illustrating an example of a case where the unit of wrap around is small. The unit of wrap around is 2 in this example. In this case, the value of the group index is #0 to #9, and 4 bits are required for expression.

A constraint may be provided to prevent the excessive increase of the number of bits required outside the MIB due to the small value of the unit of wrap around. For example, the UE may assume that a value smaller than a given value (for example, 4) is not supported as the unit of wrap around.

Furthermore, it may be assumed that the bit size of the group index is fixed (for example, 3 bits), and transmission of an SSB (DRS) at a candidate position corresponding to a group index with a large value that cannot be expressed by the bit size is not supported (in other words, the UE may not expect to receive such an SSB (DRS)).

To explain using FIG. 8 as an example, for example, it may be assumed that in a case where the maximum bit size of the group index is 3, SSBs (DRS) are transmitted at position indexes #0 to #15 corresponding to the group indexes #0 to #7 and are not transmitted at position indexes #16 to #19 corresponding to the group indexes #8 and #9.

The UE may assume that the DRS unit size=one slot (one-slot) when the unit of wrap around is smaller than a given value (for example, 4). In this case, the UE may assume that the transmittable candidate position of the DRS (SSB) is only an even position index or only an odd position index.

Figure 9:
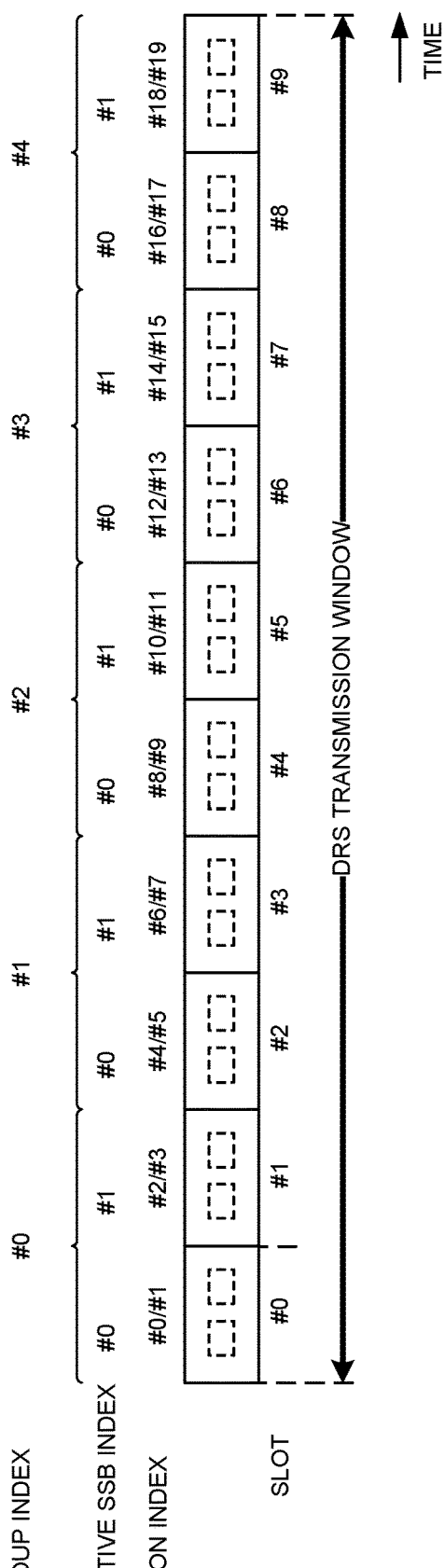
FIG. 9 is a diagram illustrating an example of an assumption of a DRS unit size in a case where a unit of wrap around is small.

FIG. 9 is a diagram illustrating an example of an assumption of the DRS unit size in a case where the unit of wrap around is small. This example is similar to FIG. 8 in that the unit of wrap around is two, but is different in that the DRS unit size is one slot instead of a half slot. In this example, the transmittable candidate position of the DRS (SSB) is only an even position index.

In FIG. 9, as compared with FIG. 8, the possible value of the group index is reduced from maximum 9 to maximum 4, and the number of bits expressing the group index is also reduced to 3 bits.

[Burst Starting Position Index]

As described above, the burst starting position index is a parameter indicating a candidate position index at which transmission of a burst of SSB (DRS) is started, and changes within the DRS transmission window. Therefore, the burst starting position index is preferably included in a part that is not the MIB in the PBCH payload.

The burst starting position index needs to represent a candidate position at which transmission may start. The maximum value of the burst starting position index may be, for example, a value of a maximum candidate position index in the DRS transmission window, or may be a value obtained by subtracting a value of the unit of wrap around from a value of a maximum candidate position index in the DRS transmission window.

In a case where there are twenty SSB candidate positions in the DRS transmission window as illustrated in FIG. 5, 5 bits are required to represent the burst starting position index. A constraint may be provided to prevent the excessive increase of the number of bits required outside the MIB due to the burst starting position index.

For example, the UE may assume that the burst starting position index is included in the PBCH payload when DRS unit size=1 slot. In this case, the UE may assume that the transmittable candidate position of the DRS (SSB) is only an even position index or only an odd position index.

The UE may assume that the maximum value of the burst starting position index is a specific value (for example, 15). Even in a case where there are twenty SSB candidate positions in FIG. 5, when the maximum value of the burst starting position index is 15, the number of bits for the index may be 4 bits. The UE may not expect reception of the SSB (DRS) at a position index exceeding the specific value, or may assume that transmission of the SSB is not started.

For example, the UE may assume that the burst starting position index is included in the PBCH payload when the value of the unit of wrap around is equal to or less than a given threshold. The UE may assume that the PBCH payload includes the group index described above when the value of the unit of wrap around obtained by the MIB is greater than the given threshold. This is because, in a case where the unit of wrap around is relatively large, the number of bits required for the group index is smaller than the burst starting position index.

According to the second embodiment described above, information necessary for frame timing derivation can be suitably notified to the UE by using the MIB and the PBCH payload other than the MIB.

Modification

Incidentally, hereinbefore, it has been assumed that the unit of wrap around is the same as the number (the number of possible values of the effective SSB index) of beams applied to the SSB and is the same as the number of DMRS sequences of the PBCH to be used. However, the unit of wrap around of the present disclosure may be different from the number of DMRS sequences of the PBCH. For example, different DMRS sequences may be used for SSBs (DRS) of the same effective SSB index.

As a result, even in a case where the unit of wrap around is a small value (for example, 1 or 2) as illustrated in FIG. 8, the size of the group can be increased, and the group index can be reduced.

The UE may assume that the number of DMRS sequences of the PBCH is greater than the value of the unit of wrap around under a given condition. For example, in a case where the unit of wrap around is a specific value (for example, 1, 2, 3, or the like), the UE may assume that there are a given number (for example, four) of patterns of the DMRS sequence of the PBCH.

In this case, when the unit of wrap around is M, a pattern #Mj+k (j is an integer, k=0, . . . , M−1) of the DMRS sequence may correspond to the effective SSB index #k. When the number of patterns of the DMRS sequence is X, it may be assumed that patterns #0 to #X−1 of the DMRS sequence are included in the same group (corresponding to the same group index).

The position index corresponding to the pattern #Y of the DMRS sequence with the group index=i (i is an integer) may correspond to #Xi+Y.

Figure 10:
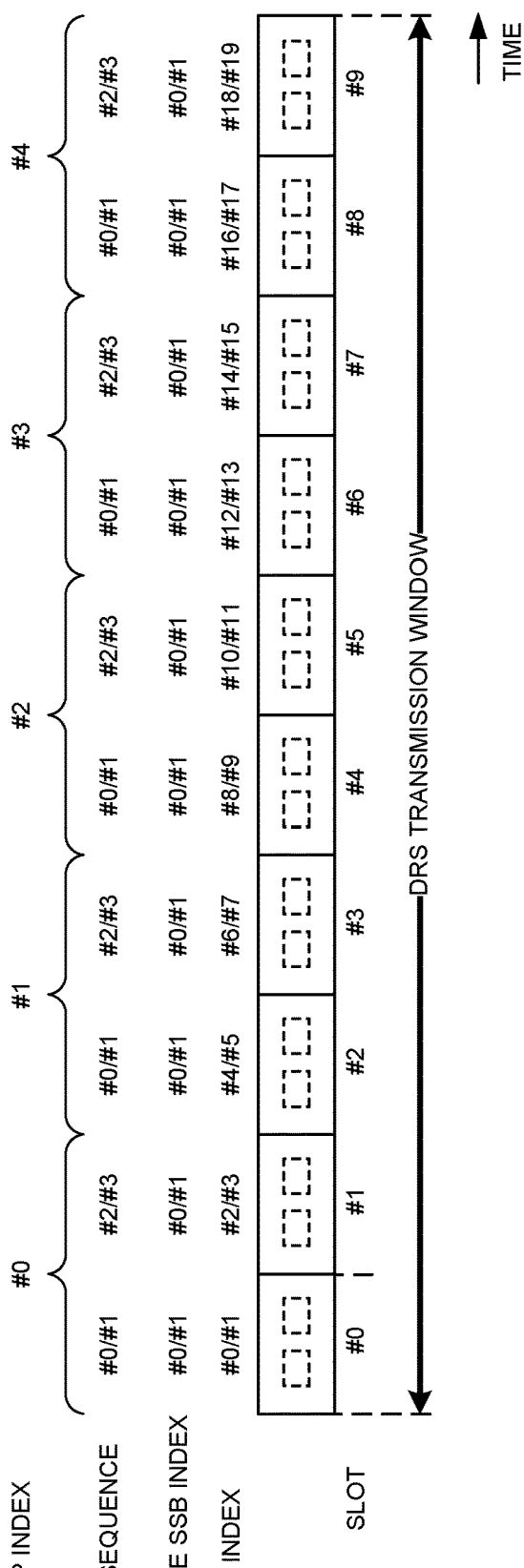
FIG. 10 is a diagram illustrating an example of a case where the number of DMRS sequences of a PBCH is larger than a unit of wrap around.

FIG. 10 is a diagram illustrating an example of a case where the number of DMRS sequences of the PBCH is larger than the unit of wrap around. In this example, the allocation of the position index and the effective SSB index is similar to that in FIG. 8. In FIG. 8, the effective SSB indexes #0 and #1 correspond to the patterns #0 and #1 of the DMRS sequence, respectively. This example is different from FIG. 8 in that the effective SSB indexes #0, #1, #0, and #1 correspond to patterns #0, #1, #2, and #3 of the DMRS sequence, respectively.

That is, the correspondence between the QCL characteristic of the SSB and the DMRS sequence is 1:1 in FIG. 8, but 1:2 in FIG. 10.

In this example, the set of patterns #0, #1, #2, and #3 of the DMRS sequence corresponds to the group indicated by the group index. In this case, the group index may mean a parameter indicating which order of candidate position in the DRS transmission window the same DMRS sequence is transmitted to.

In FIG. 10, as compared with FIG. 8, the possible value of the group index is reduced from maximum 9 to maximum 4, and the number of bits expressing the group index is also reduced to 3 bits.

Note that the range of support of the value of the unit of wrap around in the present disclosure may be limited. For example, the UE may not support a small value (for example, 1) or a specific prime number (for example, 3, 5, 7, or the like) as the unit of wrap around.

Note that the number of DMRS sequences of the PBCH may be referred to as the unit of wrap around. Further, the UE may be notified of the correspondence between the DMRS sequence and the effective SSB index by higher layer signaling (for example, MIB, SIB, or RRC). For example, in the case of the example in FIG. 10, in the UE, the patterns #0, #1, #2, and #3 of the DMRS sequence respectively corresponding to the effective SSB indexes #0, #1, #0, and #1 may be configured by using higher layer signaling.

The PBCH TTI in the present disclosure is not limited to 80 ms. A person skilled in the art can understand that the embodiments of the present disclosure can be appropriately modified and applied even in a case where the PBCH TTI is not 80 ms.

(Radio Communication System)

Hereinafter, a configuration of a radio communication system according to one embodiment of the present disclosure will be described. In this radio communication system, communication is performed using one or a combination of the radio communication methods according to the embodiments of the present disclosure.

Figure 11:
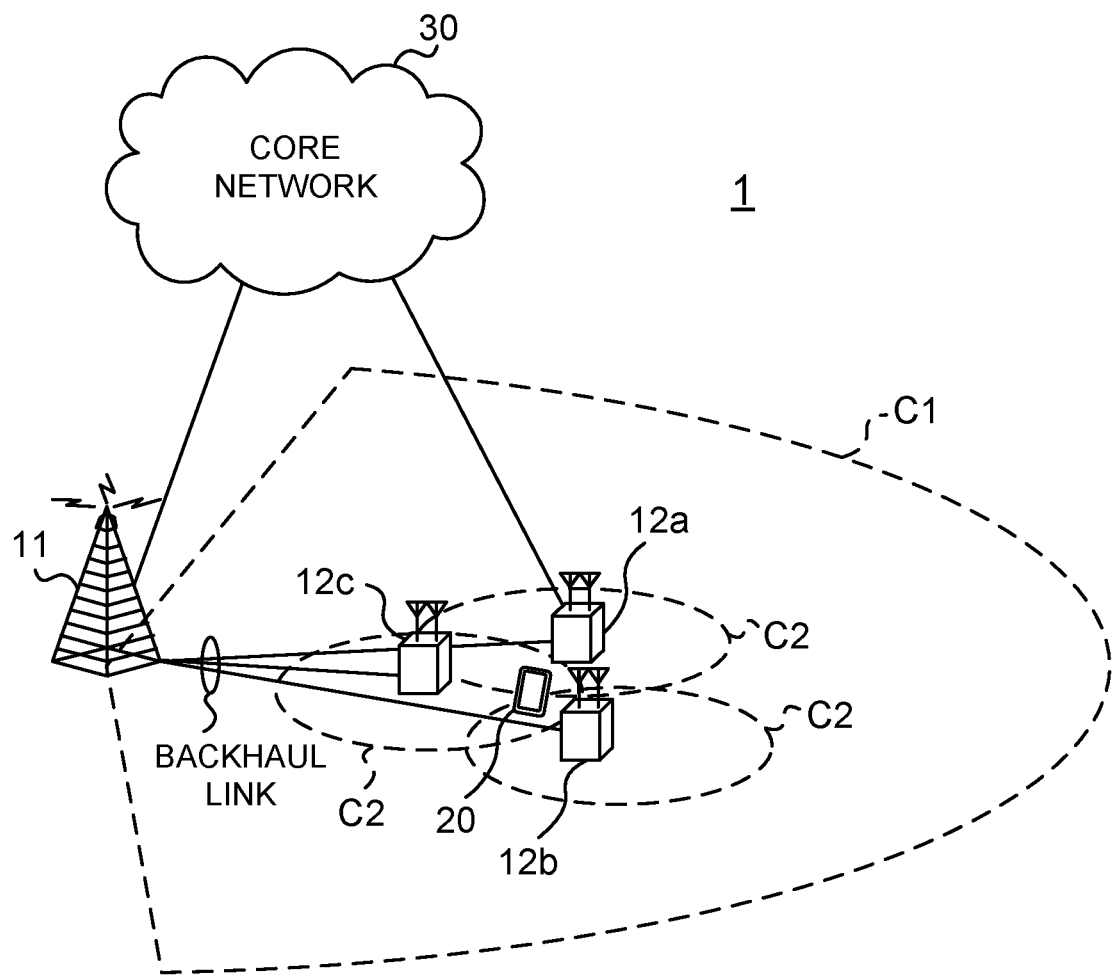
FIG. 11 is a diagram illustrating an example of a schematic configuration of a radio communication system according to one embodiment.

FIG. 11 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA Dual Connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are disposed within the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as base stations 10 unless specified otherwise.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) and a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited thereto, and, for example, FR1 may correspond to a frequency range higher than FR2.

Further, the user terminal 20 may perform communication in each CC using at least one of time division duplex (TDD) and frequency division duplex (FDD).

The plurality of base stations 10 may be connected by wire (for example, an optical fiber or an X2 interface in compliance with common public radio interface (CPRI)) or wirelessly (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that in the radio communication system 1, another radio access method (for example, another single carrier transmission method or another multi-carrier transmission method) may be used as the UL and DL radio access method.

In the radio communication system 1, as a downlink channel, a downlink shared channel (physical downlink shared channel (PDSCH)) shared by each user terminal 20, a broadcast channel (physical broadcast channel (PBCH)), a downlink control channel (physical downlink control channel (PDCCH)), or the like may be used.

Further, in the radio communication system 1, as an uplink channel, an uplink shared channel (physical uplink shared channel (PUSCH)) shared by each user terminal 20, an uplink control channel (physical uplink control channel (PUCCH)), a random access channel (physical random access channel (PRACH)), or the like may be used.

User data, higher layer control information, and a system information block (SIB) and the like are transmitted by the PDSCH. The PUSCH may transmit user data, higher layer control information, and the like. Further, the PBCH may transmit a master information block (MIB).

The PDCCH may transmit lower layer control information. The lower layer control information may include, for example, downlink control information (DCI) including scheduling information of at least one of the PDSCH and the PUSCH.

Note that DCI for scheduling the PDSCH may be referred to as DL assignment, DL DCI, or the like, and DCI for scheduling the PUSCH may be referred to as UL grant, UL DCI, or the like. Note that the PDSCH may be replaced with DL data, and the PUSCH may be replaced with UL data.

A control resource set (CORESET) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor the CORESET associated with a given search space based on search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, for example, hybrid automatic repeat request acknowledgment (HARQ-ACK), ACK/NACK, or the like), scheduling request (SR), and the like may be transmitted by the PUCCH. By means of the PRACH, a random access preamble for establishing a connection with a cell may be transmitted.

Note that in the present disclosure, downlink, uplink, and the like may be expressed without "link". Further, various channels may be expressed without adding "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be, for example, at least one of a primary synchronization signal (PSS) and a secondary synchronization signal (SSS). A signal block including SS (PSS or SSS) and PBCH (and DMRS for PBCH) may be referred to as an SS/PBCH block, an SS Block (SSB), and the like. Note that the SS, the SSB, or the like may also be referred to as a reference signal.

Further, in the radio communication system 1, a sounding reference signal (SRS), a demodulation reference signal (DMRS), and the like may be transmitted as an uplink reference signal (UL-RS). Note that, the DMRS may be referred to as a "user terminal-specific reference signal (UE-specific reference signal)".

(Base Station)

Figure 12:
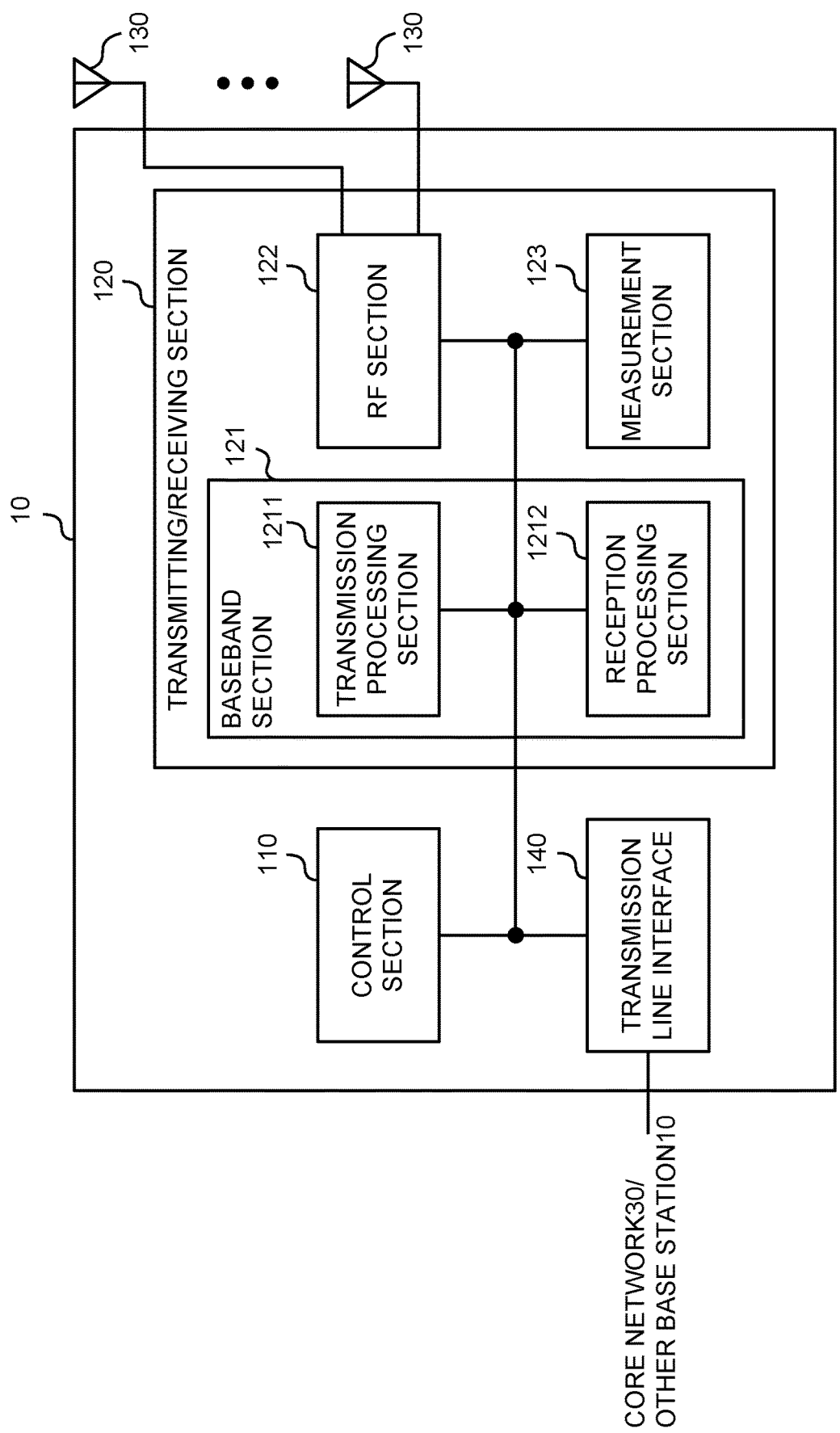
FIG. 12 is a diagram illustrating an example of a configuration of a base station according to one embodiment.

FIG. 12 is a diagram illustrating an example of a configuration of a base station according to one embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be included.

Note that, although this example primarily indicates functional blocks of characteristic parts of the present embodiment, it may be assumed that the base station 10 has other functional blocks that are necessary for radio communication as well. A part of processing of each section described below may be omitted.

The control section 110 controls the entire base station 10. The control section 110 can be configured by a controller, a control circuit, or the like, which is described based on common recognition in the technical field to which the present disclosure relates.

The control section 110 may control signal generation, scheduling (for example, resource assignment or mapping), and the like. The control section 110 may control transmission/reception, measurement, and the like using the transmitting/receiving section 120, the transmission/reception antenna 130, and the transmission line interface 140. The control section 110 may generate data to be forwarded as a signal, control information, a sequence, and the like, and may forward the data, the control information, the sequence, and the like to the transmitting/receiving section 120. The control section 110 may perform call processing (such as configuration or release) of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be configured by a transmitter/receiver, an RF circuit, a base band circuit, a filter, a phase shifter, a measurement circuit, a transmission/reception circuit, and the like, which are described based on common recognition in the technical field to which the present disclosure relates.

The transmitting/receiving section 120 may be configured as an integrated transmitting/receiving section, or may be constituted by a transmitting section and a receiving section. The transmitting section may be configured by the transmission processing section 1211 and the RF section 122. The receiving section may be configured by the reception processing section 1212, the RF section 122, and the measurement section 123.

The transmission/reception antenna 130 can be configured by an antenna described based on common recognition in the technical field to which the present disclosure relates, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmitting/receiving section 120 (transmission processing section 1211) may perform transmission processing such as channel encoding (which may include error correcting encoding), modulation, mapping, filtering processing, discrete Fourier transform (DFT) processing (if necessary), inverse fast Fourier transform (IFFT) processing, precoding, or digital-analog transform on the bit string to be transmitted, and may output a base band signal.

The transmitting/receiving section 120 (RF section 122) may perform modulation to a radio frequency band, filtering processing, amplification, and the like on the base band signal, and may transmit a signal in the radio frequency band via the transmission/reception antenna 130.

On the other hand, the transmitting/receiving section 120 (RF section 122) may perform amplification, filtering processing, demodulation to a base band signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correcting decoding), MAC layer processing, RLC layer processing, or PDCP layer processing on the acquired base band signal to acquire user data and the like.

The transmitting/receiving section 120 (measurement section 123) may perform measurement on the received signal. For example, the measurement section 123 may perform radio resource management (RRM) measurement, channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), or a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmitting section and the receiving section of the base station 10 in the present disclosure may be configured by at least one of the transmitting/receiving section 120, the transmission/reception antenna 130, and the transmission line interface 140.

Note that the transmitting/receiving section 120 may transmit information (for example, the higher layer parameter "ssb-PositionsInBurst") regarding a position of a synchronization signal block (SSB) in a synchronization signal (SS) burst to the user terminal 20.

The transmitting/receiving section 120 may transmit SSB, DRS, and the like. The transmitting/receiving section 120 may include information (for example, at least one of the information of the unit of wrap around, the information of the group index, and the information of the burst starting position index) necessary for frame timing derivation in the PBCH payload of the SSB and transmit the PBCH payload.
(User Terminal)

Figure 13:
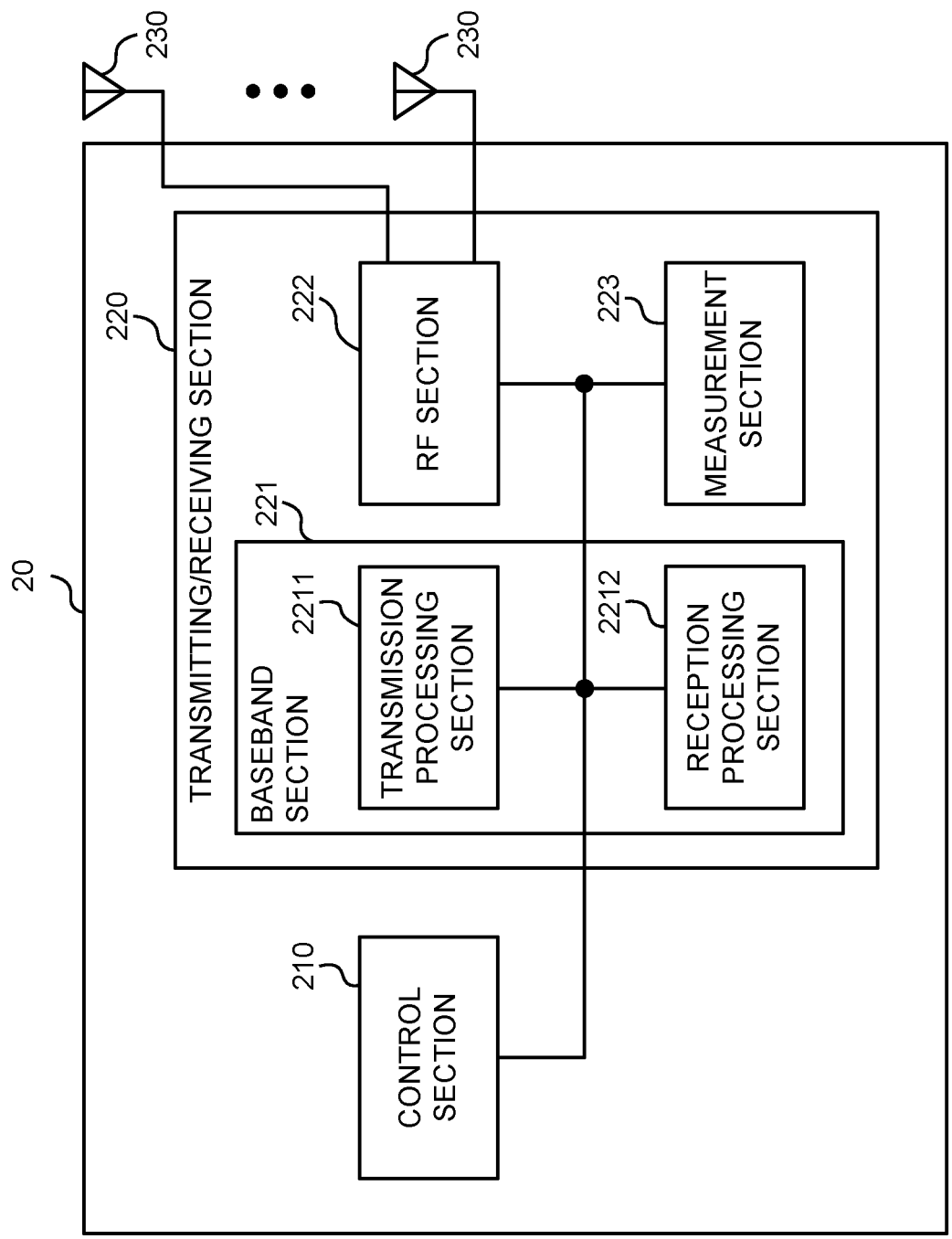
FIG. 13 is a diagram illustrating an example of a configuration of a user terminal according to one embodiment.

FIG. 13 is a diagram illustrating an example of a configuration of a user terminal according to one embodiment. The user terminal 20 includes a control section 210, a transmitting/receiving section 220, and a transmission/reception antenna 230. Note that one or more of the control sections 210, one or more of the transmitting/receiving sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can be configured by a controller, a control circuit, or the like, which is described based on common recognition in the technical field to which the present disclosure relates.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may forward the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be configured by a transmitter/receiver, an RF circuit, a base band circuit, a filter, a phase shifter, a measurement circuit, a transmission/reception circuit, and the like, which are described based on common recognition in the technical field to which the present disclosure relates.

The transmitting/receiving section 220 may be configured as an integrated transmitting/receiving section, or may be configured by a transmitting section and a receiving section. The transmitting section may be configured by the transmission processing section 2211 and the RF section 222. The receiving section may be constituted by the reception processing section 2212, the RF section 222, and the measurement section 223.

The transmission/reception antenna 230 can be configured by an antenna described based on common recognition in the technical field to which the present disclosure relates, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmitting/receiving section 220 (transmission processing section 2211) may perform transmission processing such as channel encoding (which may include error correcting encoding), modulation, mapping, filtering processing, DFT processing (if necessary), IFFT processing, precoding, or digital-analog transform on a bit string to be transmitted, and may output a base band signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the transmission processing in order to transmit the channel using a DFT-s-OFDM waveform. When transform precoding is not enabled for a channel (for example, PUSCH), the transmitting/receiving section 220 (transmission processing section 2211) may not perform DFT processing as the transmission processing.

The transmitting/receiving section 220 (RF section 222) may perform modulation to a radio frequency band, filtering processing, amplification, and the like on the base band signal, and may transmit a signal in the radio frequency band via the transmission/reception antenna 230.

On the other hand, the transmitting/receiving section 220 (RF section 222) may perform amplification, filtering processing, demodulation to a base band signal, and the like on the signal in the radio frequency band received by the transmission/reception antenna 230.

The transmitting/receiving section 220 (reception processing section 2212) may acquire user data and the like by applying reception processing such as analog-digital transform, FFT processing, IDFT processing (if necessary), filtering processing, demapping, demodulation, decoding (which may include error correcting decoding), MAC layer processing, RLC layer processing, or PDCP layer processing on the acquired base band signal.

The transmitting/receiving section 220 (measurement section 223) may perform measurement on the received signal. For example, the measurement section 223 may perform RRM measurement, CSI measurement, and the like on the basis of the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 and the transmission/reception antenna 230.

Note that the transmitting/receiving section 220 may receive the information (for example, the higher layer parameter "ssb-PositionsInBurst") regarding the position of the synchronization signal block (SSB) in the synchronization signal (SS) burst. The information may be notified using, for example, at least one of system information block 1 (SIB1) and RRC signaling.

The control section 210 may determine a quasi-co-location (QCL) assumption between SSB indexes within a transmission window of a discovery reference signal (DRS) in a carrier (for example, an unlicensed carrier) to which listening is applied based on information regarding a position of the SSB in the SS burst.

Note that the carrier to which the listening is applied may be referred to as an LAA cell, an LAA secondary cell (LAA SCell), or the like. In the carrier to which listening is applied, the user terminal 20 may perform listening before transmission. Here, "listening" in the present disclosure may be replaced with at least one of Listen Before Talk (LBT), clear channel assessment (CCA), carrier sense, sensing, channel sensing, channel access operation, and the like.

The transmitting/receiving section 220 may receive (or detect) the SSB. The control section 210 may acquire the effective SSB index based on the DMRS of the PBCH included in the SSB. Note that the SSB of the present disclosure may be replaced with the SSB included in the DRS or may be replaced with the DRS.

The control section 210 may acquire, from the payload of the PBCH, at least one of information of the number of the effective SSB indexes to be transmitted and a starting position index of an SSB burst including the SSB in a DRS transmission window.

The control section 210 may apply soft combining to decoding of a plurality of the PBCHs in the SSB burst. The transmitting/receiving section 220 may combine and receive the plurality of PBCHs in the SSB burst.

The transmitting/receiving section 220 may receive, on a given carrier (for example, the carrier to which listening is applied), a synchronization signal block (SSB) including a PBCH which does not include given information included in a physical broadcast channel (PBCH) payload other than a master information block (MIB) defined in Release 15 new radio (NR) (for example, TS 38.331 V15.4.0 (2018 December)).

Note that the "MIB specified in Release 15 NR" of the present disclosure may be replaced with a MIB (for example, an MIB including the same information as the MIB specified in Release 15 NR) defined in 3GPP Release 16 or later, a MIB for a licensed carrier, a MIB for a non-standalone, a MIB for a standalone, or the like.

The control section 210 may assume that the value of the given information is a given value. Here, the given information may be half frame bits, higher 1 bit of ssb-SubcarrierOffset, or a given number of bits among lower 4 bits of the system frame number.

In other words, the control section 210 may assume that a value of given information included in a part not corresponding to the MIB in the PBCH payload defined in Release 15 NR is a given value for a given carrier without depending on the PBCH.

The control section 210 may acquire a value of the unit of wrap around of the SSB based on information (pdcch-ConfigSIB1) for deciding a common control resource set, a common search space, and a necessary physical downlink control channel (PDCCH) parameter included in the master information block of the PBCH.

(Hardware Configuration)

Note that the block diagrams that have been used to describe the above embodiments illustrate blocks in functional units. These functional blocks (configuration units) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (using wire, wireless, or the like, for example) and using these plural apparatuses. The functional blocks may be implemented by combining software with the above-described single apparatus or the above-described plurality of apparatuses.

Here, the function includes, but is not limited to, determining, deciding, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (configuration unit) that causes transmission to function may be referred to as a transmitting unit, a transmitter, and the like. In any case, as described above, the implementation method is not particularly limited.

Figure 14:
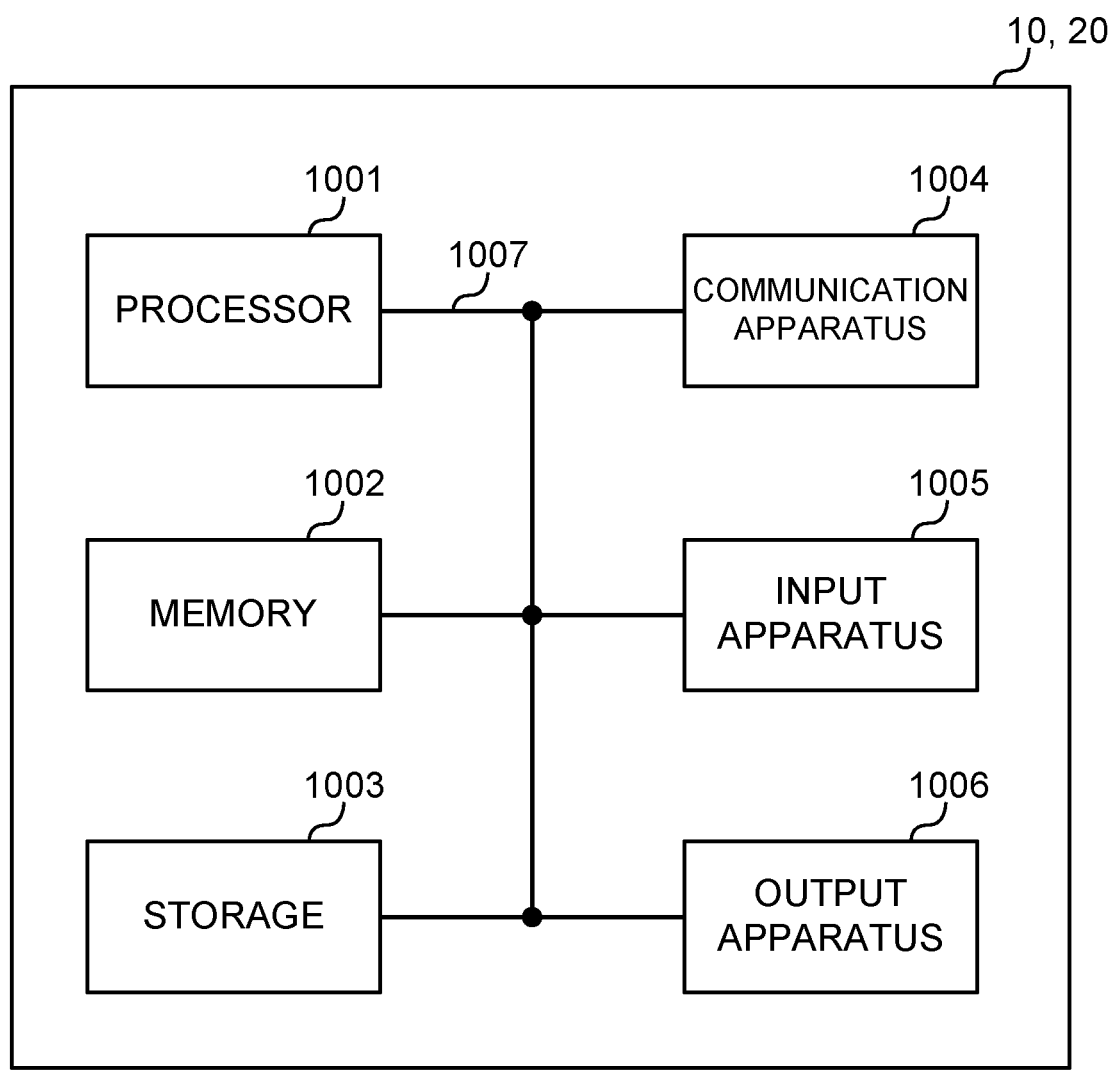
FIG. 14 is a diagram illustrating an example of a hardware configuration of the base station and the user terminal according to one embodiment.

For example, the base station, the user terminal, and the like according to one embodiment of the present disclosure may function as a computer that executes the processing of the radio communication method of the present disclosure. FIG. 14 is a diagram illustrating an example of a hardware configuration of the base station and the user terminal according to one embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit can be replaced with each other. The hardware configuration of the base station 10 and the user terminal 20 may be configured to include one or a plurality of apparatuses illustrated in the drawings, or may be configured without including some apparatuses.

For example, although only one processor 1001 is illustrated, a plurality of processors may be provided. Further, the processing may be executed by one processor, or the processing may be executed in sequence or using other different methods simultaneously by two or more processors. Note that the processor 1001 may be implemented with one or more chips.

Each function of the base station 10 and the user terminal 20 is implemented by the processor 1001. For example, the processor 1001 performs operations by causing a given software (program) to be read on hardware such as the memory 1002 to control communication via the communication apparatus 1004 and control at least one of reading and writing of data in the memory 1002 and the storage 1003.

The processor 1001 may control the whole computer by, for example, operating an operating system. The processor 1001 may be configured by a central processing unit (CPU) including an interface with peripheral equipment, a control device, an operation device, a register, and the like. For example, at least a part of the above-described control section 110 (210), transmitting/receiving section 120 (220), and the like may be implemented by the processor 1001.

The processor 1001 reads a program (program code), a software module, data, and the like from at least one of the storage 1003 and the communication apparatus 1004 into the memory 1002, and executes various pieces of processing in according therewith. As the program, a program to cause a computer to execute at least a part of the operation described in the above-described embodiment is used. For example, the control section 110 (210) may be implemented by a control program that is stored in the memory 1002 and operates in the processor 1001, and another functional block may be implemented similarly.

The memory 1002 is a computer-readable recording medium, and may be configured by, for example, at least one of a read only memory (ROM), an erasable programmable ROM (EPROM), an electrically EPROM (EEPROM), a random access memory (RAM) and/or other appropriate storage media. The memory 1002 may be referred to as a "register", a "cache", a "main memory (primary storage apparatus)", and the like. The memory 1002 can store a program (program code), a software module, and the like, which are executable for implementing the radio communication method according to one embodiment of the present disclosure.

The storage 1003 is a computer-readable recording medium, and may be configured by, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, a key drive), a magnetic stripe, a database, a server, and other appropriate storage media. The storage 1003 may be referred to as an auxiliary storage apparatus.

The communication apparatus 1004 is hardware (transmission/reception device) for allowing inter-computer communication by using at least one of a wired network and a wireless network, and may be referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by physically or logically separating a transmitting section 120a (220a) and a receiving section 120b (220b) from each other.

The input apparatus 1005 is an input device for receiving input from the outside (for example, a keyboard, a mouse, a microphone, a switch, a button, a sensor, and the like). The output apparatus 1006 is an output device that performs output to the outside (for example, a display, a speaker, a light emitting diode (LED) lamp, and the like). Note that the input apparatus 1005 and the output apparatus 1006 may be provided in an integrated structure (for example, a touch panel).

Each apparatus such as the processor 1001 and the memory 1002 is connected by the bus 1007 for communicating information. The bus 1007 may be configured by a single bus, or may be configured by buses that vary between apparatuses.

The base station 10 and the user terminal 20 may include hardware such as a microprocessor, a digital signal processor (DSP), an application specific integrated circuit (ASIC), a programmable logic device (PLD), and a field programmable gate array (FPGA), and a part or all of each functional block may be implemented by the hardware. For example, the processor 1001 may be implemented with at least one of these pieces of hardware.

Modification

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal and the like, depending on which standard applies. Further, a component carrier (CC) may be referred to as a cell, a frequency carrier, a carrier frequency, and the like.

A radio frame may include one or a plurality of periods (frames) in a time domain. Each of the one or plurality of periods (frames) included in the radio frame may be referred to as a subframe. Further, the subframe may include one or more slots in the time domain. The subframe may be a fixed time length (for example, 1 ms) not dependent on numerology.

Here, the numerology may be a communication parameter applied to at least one of transmission and reception of a signal or a channel. For example, the numerology may indicate at least one of subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, specific windowing processing performed by a transceiver in the time domain, and the like.

A slot may be configured by one or a plurality of symbols in the time domain (orthogonal frequency division multiplexing (OFDM) symbols, single carrier frequency division multiple access (SC-FDMA) symbols, and the like). Also, a slot may be a time unit based on the numerology.

A slot may include a plurality of mini slots. Each mini slot may include one or a plurality of symbols in the time domain. Further, the mini slot may be referred to as a sub slot. Each mini slot may include fewer symbols than a slot. PDSCH (or PUSCH) transmitted in a time unit larger than a mini slot may be referred to as PDSCH (PUSCH) mapping type A. A PDSCH (or PUSCH) transmitted using a mini slot may be referred to as PDSCH (PUSCH) mapping type B.

A radio frame, a subframe, a slot, a mini slot and a symbol all represent the time unit in signal communication. The radio frame, the subframe, the slot, the mini slot, and the symbol may be called by other applicable names, respectively. Note that time units such as a frame, a subframe, a slot, a mini slot, and a symbol in the present disclosure may be replaced with each other.

For example, one subframe may be referred to as TTI, a plurality of contiguous subframes may be referred to as TTI, or one slot or one mini slot may be referred to as TTI. That is, at least one of the subframe and TTI may be a subframe (1 ms) in the existing LTE, may be a period shorter than 1 ms (for example, one to thirteen symbols), or may be a period longer than 1 ms. Note that the unit to represent the TTI may be referred to as a slot, a mini slot or the like, instead of a subframe.

Here, a TTI refers to the minimum time unit of scheduling in radio communication, for example. For example, in the LTE system, a base station performs scheduling to allocate radio resources (a frequency bandwidth and transmission power that can be used in each user terminal and the like) to each user terminal in TTI units. Note that the definition of TTIs is not limited to this.

The TTI may be a transmission time unit of channel-encoded data packets (transport blocks), code blocks, codewords, or the like, or may be a unit of processing in scheduling, link adaptation, and so on. Note that, when the TTI is given, a time interval (for example, the number of symbols) to which the transport block, code block, codeword, or the like is actually mapped may be shorter than the TTI.

Note that, when one slot or one mini slot is referred to as a TTI, one or more TTIs (that is, one or more slots or one or more mini slots) may be the minimum time unit of scheduling. Further, the number of slots (the number of mini slots) configuring the minimum time unit of scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a sub slot, a slot, and the like.

Note that a long TTI (for example, a usual TTI, a subframe, or the like) may be replaced with a TTI having a time length exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of contiguous subcarriers in the frequency domain. The number of subcarriers included in the RB may be the same regardless of the numerology, and may be twelve, for example. The number of subcarriers included in the RB may be decided based on the numerology.

Further, the RB may include one or a plurality of symbols in the time domain, and may have a length of one slot, one mini slot, one subframe, or one TTI. One TTI, one subframe, and the like each may be configured by one or a plurality of resource blocks.

Note that one or a plurality of RBs may be referred to as a physical resource block (physical RB (PRB)), a sub-carrier group (SCG), a resource element group (REG), a PRB pair, an RB pair, or the like.

Further, a resource block may include one or a plurality of resource elements (REs). For example, one RE may be a radio resource field of one subcarrier and one symbol.

A bandwidth part (BWP) (which may be referred to as a partial bandwidth or the like) may represent a subset of contiguous common resource blocks (RBs) for a given numerology in a given carrier. Here, the common RB may be specified by the index of the RB based on a common reference point of the carrier. The PRB may be defined in a given BWP and be numbered within the BWP.

The BWP may include BWP for UL (UL BWP) and BWP for DL (DL BWP). For the UE, one or a plurality of BWPs may be configured within one carrier.

At least one of the configured BWPs may be active, and it may not be assumed that the UE transmits and receives a given signal/channel outside the active BWP. Note that cell, carrier, and the like in the present disclosure may be replaced with BWP.

Note that the structures of the above-described radio frame, subframe, slot, mini slot, symbol, and the like are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol duration, the length of cyclic prefix (CP), and the like can be variously changed.

Further, the information, parameters, and the like described in the present disclosure may be represented using absolute values or relative values with respect to given values, or may be represented using other corresponding information. For example, a radio resource may be instructed by a given index.

The names used for parameters and the like in the present disclosure are in no respect limiting. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represented by using any of a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Information, signals, and the like can be output at least one of from higher layer to lower layer and from lower layer to higher layer. Information, signals, and the like may be input and output via a plurality of network nodes.

The information, signals, and the like that are input and output may be stored in a specific location (for example, in a memory), or may be managed using a management table. The information, signal, and the like to be input and output can be overwritten, updated or appended. The output information, signal, and the like may be deleted. The information, signals, and the like that are input may be transmitted to another apparatus.

Notification of information may be performed not only by using the aspects/embodiments described in the present disclosure but also using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MIB), system information block (SIB), or the like), medium access control (MAC) signaling), another signal, or a combination thereof.

Note that the physical layer signaling may be referred to as layer 1/layer 2 (L1/L2) control information (L1/L2 control signal), L1 control information (L1 control signal), and the like. Further, the RRC signaling may be referred to as an RRC message, and may be, for example, an RRC connection setup message, an RRC connection reconfiguration message, and the like. Further, notification of MAC signaling may be performed using, for example, a MAC control element (MAC CE).

Further, notification of given information (for example, notification of "being X") is not limited to explicit notification but may be performed implicitly (for example, by not performing notification of the given information or by performing notification of another piece of information).

Judging may be performed using values represented by one bit (0 or 1), may be performed using Boolean values represented by true or false, or may be performed by comparing numerical values (for example, comparison with a given value).

Regardless of whether referred to as software, firmware, middleware, microcode, or hardware description language, or referred to by other names, software should be broadly interpreted so as to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, instruction, information, and the like may be transmitted/received via a transmission medium. For example, when software is transmitted from a website, a server, or another remote source by using at least one of a wired technology (coaxial cable, optical fiber cable, twisted pair, digital subscriber line (DSL), or the like) and a wireless technology (infrared rays, microwaves, and the like), at least one of the wired technology and the wireless technology is included within the definition of a transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or a plurality of (for example, three) cells. In a case where the base station accommodates a plurality of cells, the entire coverage area of the base station can be partitioned into a plurality of smaller areas, and each smaller area can provide communication services through a base station subsystem (for example, small remote radio head (RRH) for indoors). The term "cell" or "sector" refers to a part or the whole of a coverage area of at least one of a base station and a base station subsystem that perform a communication service in this coverage.

In the present disclosure, the terms such as "mobile station (MS)", "user terminal (user terminal)", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission apparatus, a reception apparatus, a radio communication apparatus, and the like. Note that at least one of the base station and the mobile station may be a device mounted on a moving object, a moving object itself, and the like. The moving object may be a transportation (for example, a car, an airplane and the like), an unmanned moving object (for example, a drone, an autonomous car, and the like), or a (manned or unmanned) robot. Note that at least one of the base station and the mobile station also includes an apparatus that does not necessarily move during a communication operation. For example, at least one of the base station and the mobile station may be an Internet of Things (IoT) device such as a sensor.

The base station in the present disclosure may be replaced with a user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In the case, the user terminal 20 may have the function of the above-described base station 10. Further, terms such as "uplink" and "downlink" may be replaced with terms corresponding to communication between terminals (for example, "side"). For example, the uplink channel, the downlink channel, and the like may be replaced with a side channel.

Similarly, the user terminal in the present disclosure may be replaced with a base station. In this case, the base station 10 may be configured to have the above-described functions of the user terminal 20.

In the present disclosure, the operation performed by the base station may be performed by an upper node thereof in some cases. In a network including one or a plurality of network nodes including the base station, it is clear that various operations performed to communicate with terminals may be performed by the base station, one or a plurality of network nodes other than the base station (for example, mobility management entity (MME), serving-gateway (S-GW), and the like are conceivable, but there is no limitation), or a combination thereof.

Each aspect/embodiment described in the present disclosure may be used alone, used in combination, or switched in association with execution. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded on the basis of these, and the like. Further, a plurality of systems may be combined (for example, a combination of LTE or LTE-A and 5G) and applied.

The term "based on" used in the present disclosure does not mean "only based on" unless otherwise specified. In other words, the term "based on" means both "only based on" and "at least based on".

Any reference to an element using designations such as "first" and "second" used in the present disclosure does not generally limit the amount or order of these elements. These designations may be used in the present disclosure only for convenience, as a method for distinguishing between two or more elements. In this way, reference to the first and second elements does not imply that only two elements may be employed, or that the first element must precede the second element in some way.

The term "determining (deciding)" used in the present disclosure may include a wide variety of operations. For example, "determining (deciding)" may be regarded as "determining (deciding)" of judging, calculating, computing, processing, deriving, investigating, looking up, search, inquiry (for example, looking up in a table, database, or another data structure), ascertaining, and the like.

Further, "determining (deciding)" may be regarded as "determining (deciding)" of receiving (for example, receiving information), transmitting (for example, transmitting information), input, output, accessing (for example, accessing data in a memory), and the like.

Further, "determining (deciding)" may be regarded as "determining" of resolving, selecting, choosing, establishing, comparing, and the like. That is, "determining (deciding)" may be regarded as "determining (deciding)" some operations.

Further, "determining (deciding)" may be replaced with "assuming", "expecting", "considering", and the like.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access".

As used in the present disclosure, when two elements are connected, these elements may be considered "connected" or "coupled" to each other by using one or more electrical wires, cables, printed electrical connections, and the like, and, as a number of non-limiting and non-inclusive examples, by using electromagnetic energy having wavelengths in a radio frequency domain, a microwave domain, and an optical (both visible and invisible) domain, or the like.

In the present disclosure, the description of "A and B are different" may mean "A and B are different from each other". Note that the description may mean that "A and B are different from C". The terms such as "separated", "coupled", and the like may be interpreted as "different".

When the terms such as "include", "including", and variations of these are used in the present disclosure, these terms are intended to be inclusive, in a manner similar to the way the term "comprising" is used. Further, the term "or" as used in the present disclosure is intended to be not an exclusive-OR.

In the present disclosure, for example, when translations add articles, such as a, an, and the in English, the present disclosure may include that the noun that follows these articles is in the plural.

Now, although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims. Therefore, the description in the present disclosure is provided for the purpose of describing examples, and thus, should by no means be construed to limit the invention according to the present disclosure in any way.

The invention claimed is:

1. A terminal comprising:
   a receiver that receives a synchronization signal block (SSB) including a physical broadcast channel (PBCH); and
   a processor that determines, based on at least one of parameters included in master information block (MIB) of the PBCH, a unit of wrap around of the SSB,
   wherein information on the unit of the wrap around includes information on a number of transmitted SSBs, and
   wherein the information on the unit of the wrap around includes information for determining an SSB index that can be quasi-co-location (QCL)-assumed among SSB candidate indexes.

2. The terminal according to claim 1, wherein the at least one of the parameters is a value that indicates a frequency domain offset between the SSB and an overall resource block grid by a number of subcarriers.

3. The terminal according to claim 1, wherein the at least one of the parameters is ssb-SubcarrierOffset.

4. The terminal according to claim 1, wherein a group index that indicates a number of the wrap around of the SSB is determined based on a part other than the MIB in the PBCH.

5. The terminal according to claim 1, wherein the receiver receives the SSB in a carrier in which listening (listen-before-talk (LBT)) is used.

6. A radio communication method for a terminal, comprising:
   receiving a synchronization signal block (SSB) including a physical broadcast channel (PBCH); and
   determining, based on at least one of parameters included in master information block (MIB) of the PBCH, a unit of wrap around of the SSB,
   wherein information on the unit of the wrap around includes information on a number of transmitted SSBs, and
   wherein the information on the unit of the wrap around includes information for determining an SSB index that can be quasi-co-location (QCL)-assumed among SSB candidate indexes.

7. A base station comprising:
   a transmitter that transmits a synchronization signal block (SSB) including a physical broadcast channel (PBCH); and
   a processor that controls to include a parameter for determining a unit of wrap around of the SSB in master information block (MIB) of the PBCH,
   wherein information on the unit of the wrap around includes information on a number of transmitted SSBs, and
   wherein the information on the unit of the wrap around includes information for determining an SSB index that can be quasi-co-location (QCL)-assumed among SSB candidate indexes.

8. A system comprising a terminal and a base station, wherein
   the terminal comprises:
      a receiver that receives a synchronization signal block (SSB) including a physical broadcast channel (PBCH); and
      a processor of the terminal that determines, based on at least one of parameters included in master information block (MIB) of the PBCH, a unit of wrap around of the SSB,
      wherein information on the unit of the wrap around includes information on a number of transmitted SSBs, and
      wherein the information on the unit of the wrap around includes information for determining an SSB index that can be quasi-co-location (QCL)-assumed among SSB candidate indexes, and
   the base station comprises:
      a transmitter that transmits the SSB; and
      a processor of the base station that controls to include the parameter in the MIB.

* * * * *